Jan. 12, 1965     M. WALLSHEIN     3,164,900

ORTHODONTIC BRACKET

Filed March 7, 1961

*INVENTOR,*
MELVIN WALLSHEIN,

BY

*ATTORNEY.*

United States Patent Office 3,164,900
Patented Jan. 12, 1965

3,164,900
ORTHODONTIC BRACKET
Melvin Wallshein, 8645 Bay Parkway, Brooklyn, N.Y.
Filed Mar. 7, 1961, Ser. No. 105,248
3 Claims. (Cl. 32—14)

The present invention relates to improved fittings for use in orthodontia and more particularly to clamps for attachment to an arch wire which when mounted on tooth-encircling bands or other support means, will serve as brackets to hold the arch wire. Further, these devices may be made in various sizes to serve as clamps generally for various uses.

An object of this invention is to provide a novel and improved clamping device to serve for the purposes mentioned, which will accommodate wires of different sizes and in various embodiments thereof will hold more than one wire at a time and if desired, will hold bent wires which may be stressed to exert forecs as may be required when used in orthodontia.

Another object thereof is to provide novel and improved devices of the character mentioned, which are reasonable in cost, simple in construction, easy to use and efficient in carrying out the purposes for which they are designed.

Other objects and advantages will become apparent as this disclosure proceeds.

For one form of practice of this invention the body of the clamp is a tapered form presenting an open channel or mouth whose lips are at the apex region of such body. This body has some resilient quality so that when a retainer ring is forced or turned as a nut thereon, the mouth will close somewhat and thereby securely clamp a wire which is within and across the mouth. Mouth surfaces may be serrated and the tapered surfaces receiving the ring or nut may be provided with notches or threads. If desired, the body may have intersecting mouths whereby crossed or bent wires may be held. The mouth may be a V-channel or of rectangular cross section. In other embodiments, the mouth may extend inwardly from the base of said tapered body. The clamp may be made of rod stock suitably machined or it may be bent from wire or strip material.

Various forms embodying the teachings of this invention will now be set forth in detail, for which reference is had to the accompanying drawing forming part of this specification and in which drawing, similar characters of reference indicate corresponding parts in all the views.

Figure 8:
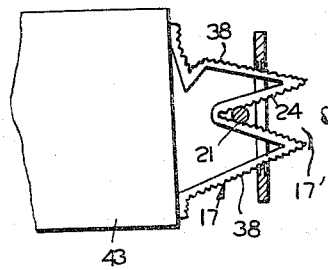

FIG. 8 is a side view of another orthodontic fitting supporting an arch wire. This view is fragmentary and enlarged. The ring is in section.

Figure 9:
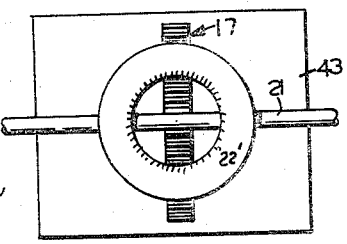

FIG. 9 is a front view of the fitting shown in FIG. 8. Here, the clamp is shown made of strip material.

Figure 10:
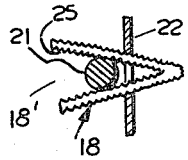

FIG. 10 is a side view of another form of clamp structure, whose body is of wire or strip material.

Figure 1:
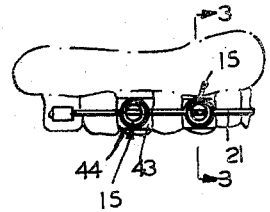
FIG. 1 is a fragmentary side view of a patient's upper teeth about which is an orthodontic arch wire or cable shown mounted on brackets embodying teachings of this invention.
Figure 2:
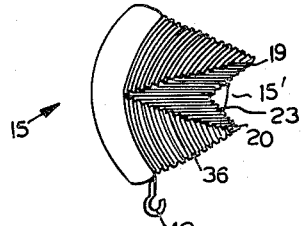
FIG. 2 is an enlarged perspective view of the clamping member used for said brackets.

In the drawing, the numerals 15'–18' designate generally what may be called mouths in the respective tapered forms indicated generally by the numerals 15–18 which may be called clamp bodies. Those marked 15 and 16 may be made from bar stock and those indicated as 17 and 18 may be made of strip or wire. The material used for these bodies has some resilient quality so that when any mouth is closed somewhat, it shall spring back to fully open condition when the lips are let go. In FIG. 2, the lips are indicated by the numerals 19 and 20 respectively. After a wire is placed within and across a mouth 15'–18', as for instance the arch wire 21, a retainer ring or a nut 22 is forced or screwed onto the clamp body to pinch or force its lips a bit together, whereupon the wire is securely clamped. Peripheral serrations or threads to engage the ring may be provided as at 36, or there may be suitable grooves as at 37, 37' or serrations as at 38, across the outer surfaces of the clamp body as may be appropriate. Mouth surfaces may be serrated as shown at 23, 24 and 25. If desired, the ring fit may be frictional instead of using serrations or threads as would be the case of associating a ring 39 and a clamp body 16 in which the grooves 37, 37' are omitted. The size of the ring hole is preferably sufficient to admit therein a bit of the apex region of the clamp body. The body 40 is like 15, except that it is provided with a second mouth 40" which intersects its first mouth 40' and though its outer surface is shown minus serrations for engagement of the ring 22, such serrations or threads as at 36 may be provided on body 40. The clamp bodies 15, 16 and 40 may be machined from bar stock, forged or made by another suitable manufacturing process. The bodies 17 and 18 may be bent from either strip or wire. The tapered body may be conical as 15 or 40 or pyramidic as 16. One or both faces of the ring or nut 22 may have serrations 22', at least around the hole as shown in FIG. 9 to avoid accidental unscrewing. The mouth, serration or thread structure in one, may be substituted in any of the other clamp bodies wherever applicable. Mouth entrance may be at the apex as in the bodies 15, 16, 17 and 40, or at the base of tapered form as in the body 18.

Figure 3:
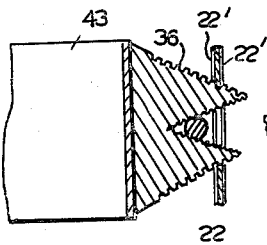
FIG. 3 is an enlarged fragmentary section taken at line 3—3 in FIG. 1.
Figure 4:
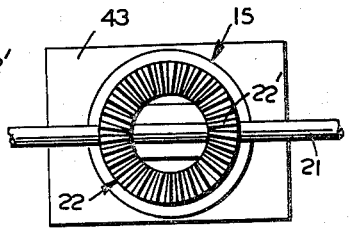
FIG. 4 is a side view of FIG. 3.
Figure 5:
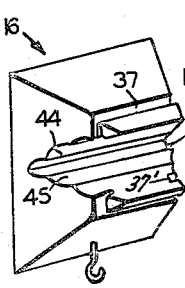
FIG. 5 is a perspective view of another form of clamping member.
Figure 6:
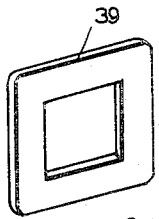
FIG. 6 is a perspective view of the ring adapted for association with the clamp body of FIG. 5.
Figure 7:
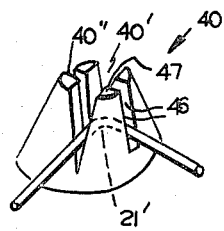
FIG. 7 is a perspective view of a clamping body having crossed mouths.

For use as a clamp to be applied to the arch wire 21 in orthodontia, the clamp body may be provided with a hook 42 or other orthodontic auxiliary member, and for use as a bracket, any clamp body is welded or otherwise suitably mounted on a tooth-encircling band 43 which is fitted tightly on a tooth 44. If the wire 21 is set to contact the mouth surfaces and then the ring 22 is forced on as in FIG. 3, said wire will be tightly gripped. If the wire size is such that it contacts only one face of the mouth when the ring is mounted, said wire will be loose. In orthodontia, some instances require a tight grip so that the wire is anchored, and in other cases it is desired that the bracket shall support the arch wire, but that such held wire shall be free for longitudinal movement. When tightly held, it is evident that the serrations as 23 will bite into the wire to aid the hold thereon. If desired, the mouth faces may be channeled as at 44, 45 in the embodiment shown in FIG. 5 to receive different size wires one or two at a time. The mouth may be V-shaped, or have parallel surfaces as at 46. When crossed mouths are used as in the clamp body shown in FIG. 7, the arch wire may be bent to have an angle band 21' to straddle a prong 47, and be loose and tensed whereby its tendency to straighten will cause a torque force on the member 40 as is a practice in orthodontia for purposes well known.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific description herein to indicate the scope of this invention.

I claim:

1. A wire clamping device comprising a resilient M-shaped member formed of a single length of material, said member having outwardly diverging leg portions with outer surfaces, and the top of the M-shaped member forming a V-shaped channel having converging inner surfaces, a ring member engaged upon the outer surfaces of the leg portions, said ring member having an inner diameter greater than the distance across the V-shaped channel and less than the distance between the ends of the outwardly diverging leg portions, and cooperative engaging means on the inside diameter of the ring and the outer surfaces of the leg portions preventing slippage of the ring member off the M-shaped member, whereby a wire may be clamped within the V-shaped channel by the ring member and the resilient action of the converging inner surfaces of the channel.

2. A device as in claim 1, including a means adapted to be mounted on a tooth and the ends of the leg portions secured to said means.

3. A device as in claim 1, wherein the cooperative engaging means include serrations on the outer surfaces of the leg portions.

References Cited in the file of this patent
UNITED STATES PATENTS

| | | |
|---|---|---|
| 270,705 | Tumey | Jan. 16, 1883 |
| 529,933 | Mullen | Nov. 27, 1894 |
| 817,588 | Reising | Apr. 10, 1906 |
| 1,797,194 | Knapp | Mar. 17, 1931 |
| 2,767,469 | Gladstone | Oct. 23, 1956 |